United States Patent
Tucker et al.

(10) Patent No.: US 6,631,323 B2
(45) Date of Patent: Oct. 7, 2003

(54) METHOD AND APPARATUS FOR IMPROVING PERFORMANCE OF AN INERTIAL NAVIGATION SYSTEM HAVING GLOBAL POSITIONING SYSTEM CORRECTIONS

(75) Inventors: Terry A. Tucker, Charlottesville, VA (US); Albert L. Coleman, Aftom, VA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 09/863,994

(22) Filed: May 23, 2001

(65) Prior Publication Data

US 2002/0026283 A1 Feb. 28, 2002

Related U.S. Application Data (60) Provisional application No. 60/207,910, filed on May 30, 2000.

(51) Int. Cl.$^7$ .............................................. G01C 21/00
(52) U.S. Cl. ................................................. 701/221
(58) Field of Search ............................. 701/1, 21, 23, 701/26, 34, 200, 207, 213–217, 220–221; 342/357.01–357.04, 357.06, 357.08, 357.12, 357.14, 358

(56) References Cited

U.S. PATENT DOCUMENTS 6,037,893 A * 3/2000 Lipman ....................... 342/184
6,205,401 B1 * 3/2001 Pickhard et al. ............ 342/358
6,278,945 B1 * 8/2001 Lin ............................. 701/216

FOREIGN PATENT DOCUMENTS

JP          6317428      * 11/1994      ........... G01C/21/00

* cited by examiner

Primary Examiner—Thu Nguyen
(74) Attorney, Agent, or Firm—Seymour Levine; Gerald L. Lett; Jason M. Shapiro (57) ABSTRACT

Performance of an inertial navigation system (INS) corrected with GPS position data is enhanced with the addition of a filter that smooths the GPS-INS position difference data and couples the smoothed data to the INS position data. Difference data provided to the filter is edited to eliminate GPS-INS position data that excceeds a predetermined level. Performance is further improved by applying position resets from the INS Kalman filter in a ramp like manner.

20 Claims, 6 Drawing Sheets

METHOD AND APPARATUS FOR IMPROVING PERFORMANCE OF AN INERTIAL NAVIGATION SYSTEM HAVING GLOBAL POSITIONING SYSTEM CORRECTIONS

The priority benefit of Provisional Application No. 60/207,910 filed on May 30, 2000 is claimed by this application.

BACKGROUND OF THE INVENTION

1. Field of the Invention

This invention pertains to navigation systems, and more particularly to the correction of Inertial Navigation Systems with the utilization of Global Position System data.

2. Description of the Prior Art

Inertial Navigation Systems (INS) on ships generally provide good position accuracy. Component drift, however, degrades the navigation accuracy over a period of time and correction becomes necessary. These corrections are facilitated with the utilization of the Global Positioning System (GPS). If, however, the inertial position is tightly slaved to the GPS, the output position contains too much GPS short-term noise.

Use of GPS data alone is not reliable because of short-term noise in position data and occasional erroneous GPS data samples due to change of constellation or other GPS problems. INS data alone, even while using a GPS for reference, does not provide sufficient position accuracy when the position accuracy desired is but a few meters. A closely coupled INS/GPS solution may introduce GPS short-term noise into the integral of velocity data, thus causing an out-of-specification error in the position output.

The mean value of GPS position data is believed to be accurate, for normal surface ship navigation conditions, with a mean value position error, 95% of the time, that is less than 5 meters. Excessive errors are observed in GPS position for single data samples and at the change of satellite constellation. Inertial position provided by a good INS is not as accurate as GPS; but is believed to be smoother over short periods of time than GPS data.

What is needed is a filtered INS/GPS position output to follow the mean GPS position smoothly and eliminate high frequency position errors that are present in the GPS position data. This filtered INS/GPS position output would combine the good long term accuracy (low frequency) content of the GPS position with the good short term (high frequency) content of the INS position.

SUMMARY OF THE INVENTION

The present invention uses data editing to eliminate obviously large errors in GPS data and a low pass filter on the difference between INS and GPS position to form a complementary filter which combines the good long term accuracy (low frequency) content of the GPS position with the good short term (high frequency) content of the INS position. To achieve the desired position accuracy, lever arm correction of the GPS input data is performed.

Enhanced position accuracy is provided by correcting INS Latitude and Longitude output to more closely match a GPS receiver output. This correction provides less variation (jumps) in position than the GPS alone. On ships that have more than one INS, GPS data sent to one INS is lever arm corrected by the GPS receiver. An INS other than the one INS is data and lever arm corrected by the one INS which is coupled to the GPS receiver. A filtered difference between the GPS and the INS positions are taken and applied as a correction to the INS position. Additionally, position reset step size is reduced by changing position resets from a step to a ramp applied over the time period between position resets.

BRIEF DESCRIPTION OF THE DRAWINGS

A better understanding of the invention will be obtained from the description of the preferred embodiment with reference to the following drawings, in which.

DESCRIPTION OF THE PREFERRED EMBODIMENTS

Figure 1:
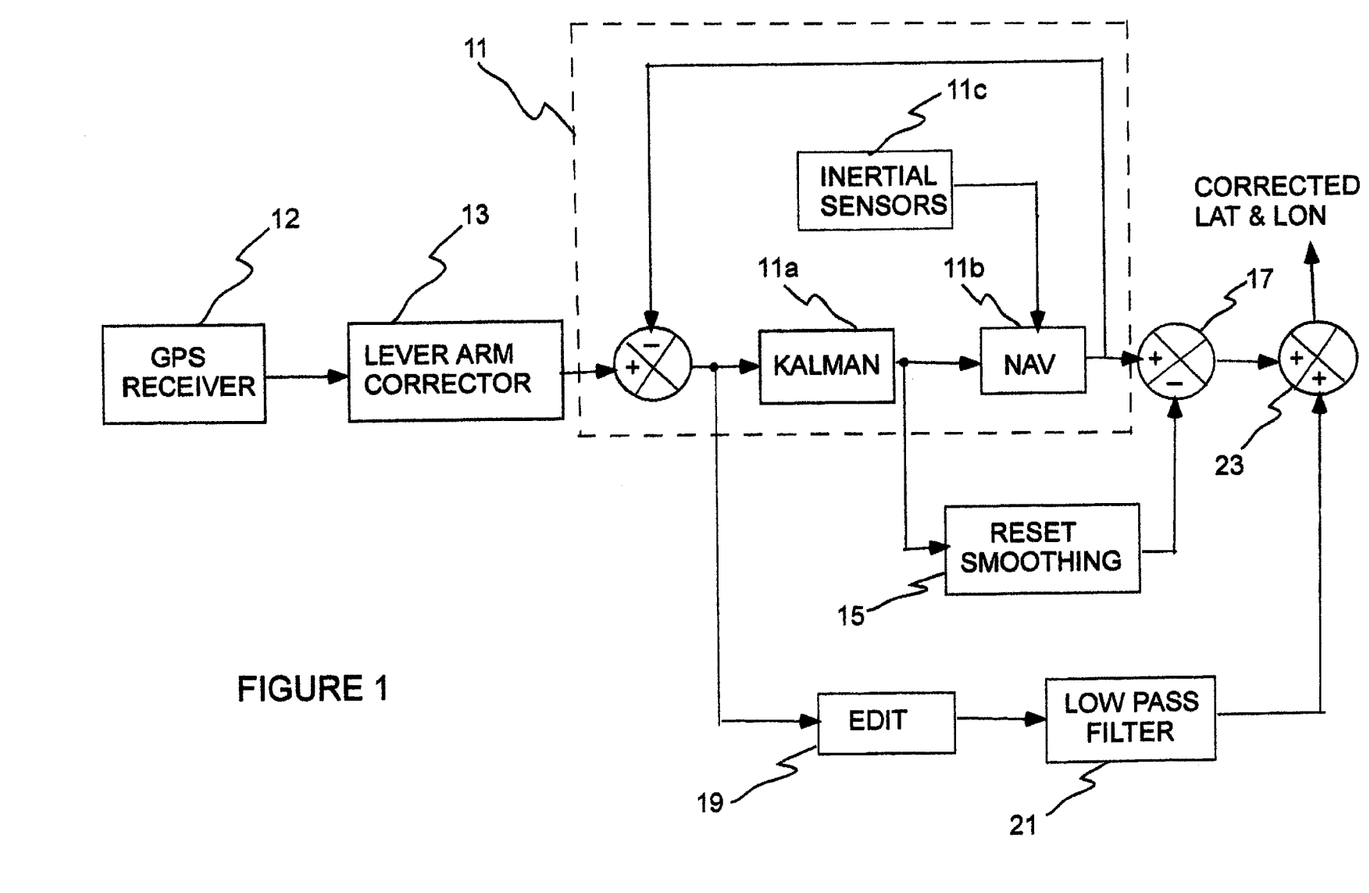
FIG. 1 is a block diagram of a preferred embodiment of the invention.
Figure 2:
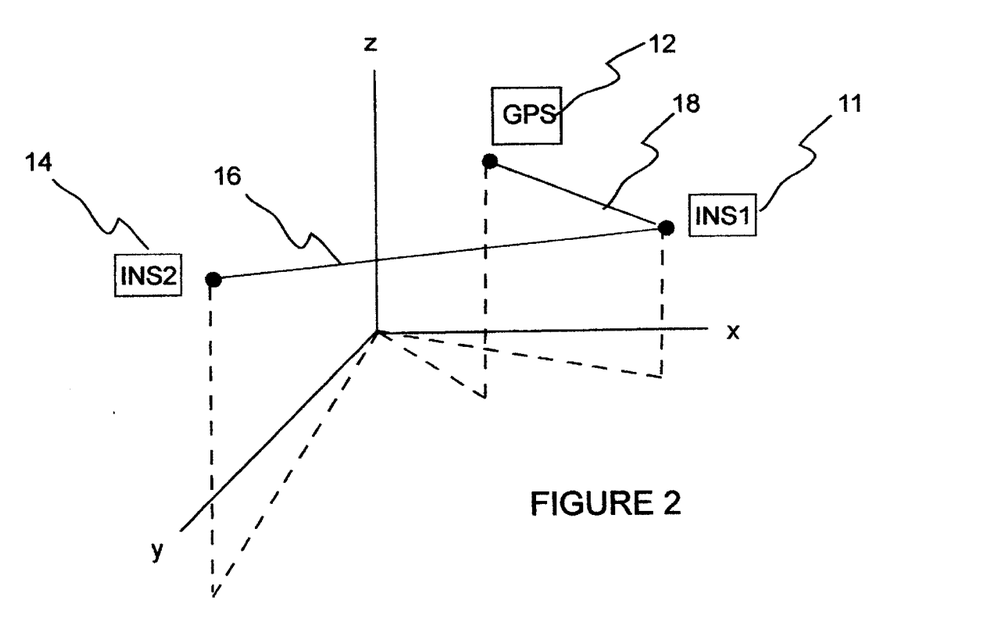
FIG. 2 is a diagram indicating the lever arms between INS and GPS units.
Figure 2A:
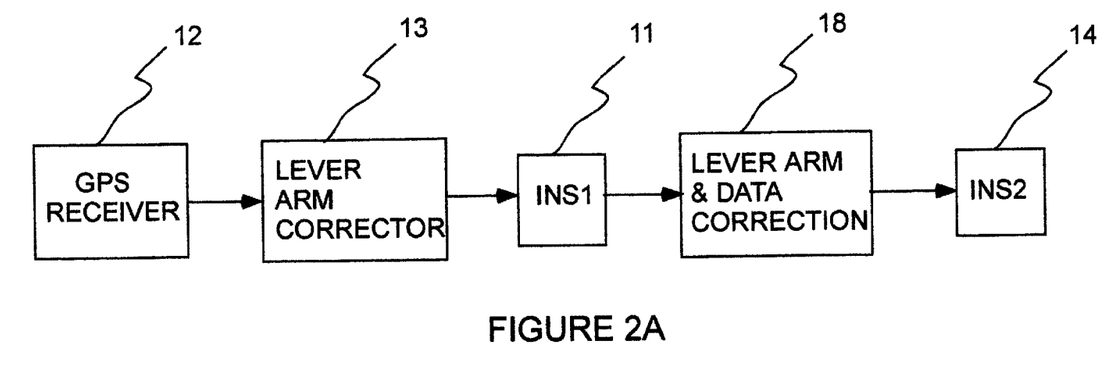
FIG. 2A is block diagram showing the position corrections from a GPS receiver to a first INS and from the first INS to a second INS.

Refer now to FIG. 1. GPS position data is coupled from a GPS receiver 12 to an inertial navigation system (INS) 11 via a lever arm corrector 13, wherein the GPS position data is transformed to the coordinate system of the INS. As shown in FIG. 2, the GPS may be at distance (lever arm) 18 from a navigation system INS1 11. To provide accurate position data with GPS corrections it is necessary to transform the GPS data to the INS1 position. If the navigation system is on a vehicle such as a ship, the pitch, roll, and heading must be considered in the determination of the component differentials, which can be evaluated from $$\begin{bmatrix} \Delta X \\ \Delta Y \\ \Delta Z \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} X_{LA} \\ Y_{LA} \\ Z_{LA} \end{bmatrix}$$

where: $X_{LA}$, $Y_{LA}$, and $Z_{LA}$ are the component distances from the GPS positon to the position of the INS;

$b_{11} = \cos P \cos H$ $b_{12} = -\cos R \sin H + \sin R \sin P \cos H$ $b_{13} = \sin R \sin H + \cos R \sin P \cos H$ $b_{21} = \cos P \sin H$ $b_{22} = \cos R \cos H + \sin R \sin P \sin H$ $b_{23} = -\sin R \cos H + \cos R \sin P \sin H$ $b_{31} = -\sin P$ $b_{32}$=sin R cos P $b_{33}$=cos R cos P H=heading, P=pitch, and R=roll Refer now to FIG. 2A with continued reference to FIG. 2, wherein elements previously mentioned bear the same reference numeral. Should a second navigation system INS2 14 be on board at a distance (lever arm) 16 from INS1 11, correction data and lever arm corrections are provided to INS2 14 from INS1 11 through data and lever arm corrector 13. Lever arm corrections ΔX, ΔY, Δz are determined from the above equation by replacing the GPS component distances to INS1 with INS1 component distances from INS2. Because of the limited number of GFS output terminals, applying correction data to INS2 in this manner eliminates a position error that is introduced in one of the INS systems when both systems are corrected directly from the GPS.

It should be recognized that ΔX, ΔY, Δz are in linear units. If position corrections are required in terms of latitude and longitude these values must be converted into the angular units on the earth's surface to provide the corrections Δlat and Δlon.

Navigation system 11 may be a conventional navigation system comprising a Kalman filter 11a, a navigator 11b, and inertial sensors 11c. The abrupt step that occurs when resetting the INS position with GPS position data is minimized by spreading the reset over an extended time interval, which may be selected to be one minute. A reset smoothing element 15 may be coupled to receive the reset position step from the Kalman filter 11a and subtract this data from the navigator 11b data in a differencing element 17. Reset element 15 smooths the data reset by applying the negative of the reset and decaying this compensation in a ramp like manner to smooth the applied reset. As an example, consider the correction data rate of the Kalman filter 11a to be 50 Hz and the selected extended time interval to be one minute. To provide a correction Δu in a ramp like manner over the one minute time interval the reset element 15 applies a compensation of (Δu−Δu/n), (Δu−2Δu/n), (Δu−3Δu/n), etc. at the 50 Hz rate, where n=50×60=3000. The difference of the Δu reset and the compensation is then Δu/n, 2Δu/n, 3Δu/n, etc. and the total correction of Δu has been accomplished at the conclusion of 3000 corrections.

Excessive errors may be observed in GPS position for single data samples and at a change of satellite constellation. The effect of these changes may be minimized with the utilization of an edit element 19, coupled to receive the difference between the GPS data and the output data of navigator 11b, and a low pass filter 21, coupled to receive data from the edit element 19 and to couple the filtered data to an addition element 23 whereat the filtered data is added to correct the output data.

Edit element 19 is configured to eliminate data differences between GPS position data and the navigator 11b position data that would cause the data output from the filter 21 to exceed a preselected performance goal. This editing allows the system to maintain desired accuracy during transitions at the start of GPS availability, end of GPS position availability, transitions between GPS constellations, step changes in GPS position, and GPS erroneous fixes.

Figure 3:
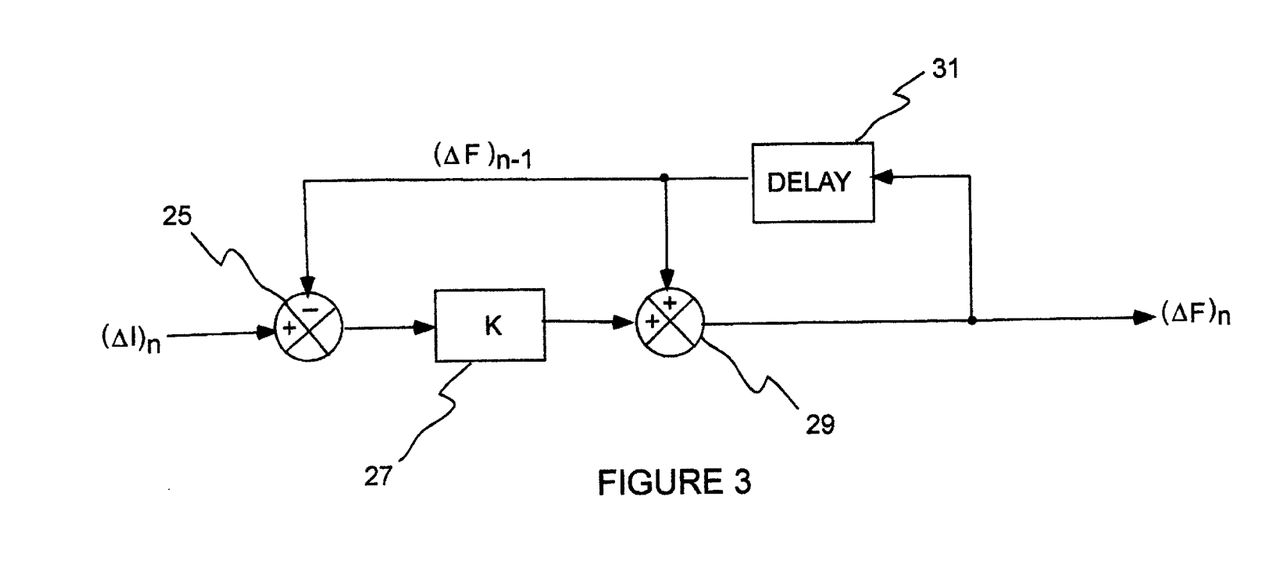
FIG. 3 is a diagram of a low pass filter that may be used as the filter element in FIG. 1.

Improved position accuracy may be obtained by coupling the edited difference between GPS position data and the INS position data to the low pass filter 21, which may be a filter such as that shown in FIG. 3. In this filter $(\Delta F)_n$ is representative of the filtered difference between GPS latitude or longitude and the corresponding inertial component at a predetermined time interval, $(\Delta F)_{n-1}$ is representative of the filtered difference between GPS latitude or longitude and the corresponding inertial component at the n−1 predetermined time interval, and $(\Delta I)_n$ is representative of the measured difference between GPS latitude or longitude and the corresponding inertial component at the nth predetermined time interval. A difference element 25 determines the difference between $(\Delta I)_n$ and $(\Delta F)_{n-1}$. This difference is multiplied by a constant K in multiplier 27 wherefrom the multiplied difference is added to $(\Delta F)_{n-1}$ in adder 29 to obtain the filtered difference for the current iteration. This filtered difference is delayed in a delay element 31 for the next iteration. The equation for each iteration is given by $$(\Delta F)_n = (\Delta F)_{n-1} + K[(\Delta I)_n - (\Delta F)_{n-1}]$$

After N iterations the output of the filter is $$(\Delta F)_N = (1-K)^N (\Delta F)_O + K \sum_{n=1}^{N} (1-K)^{N-n} (\Delta I)_n$$

where $(\Delta F)_O$ is value of ΔF at the first iteration and K is the ratio of the computation sample time to the filter time constant.

Figure 4:
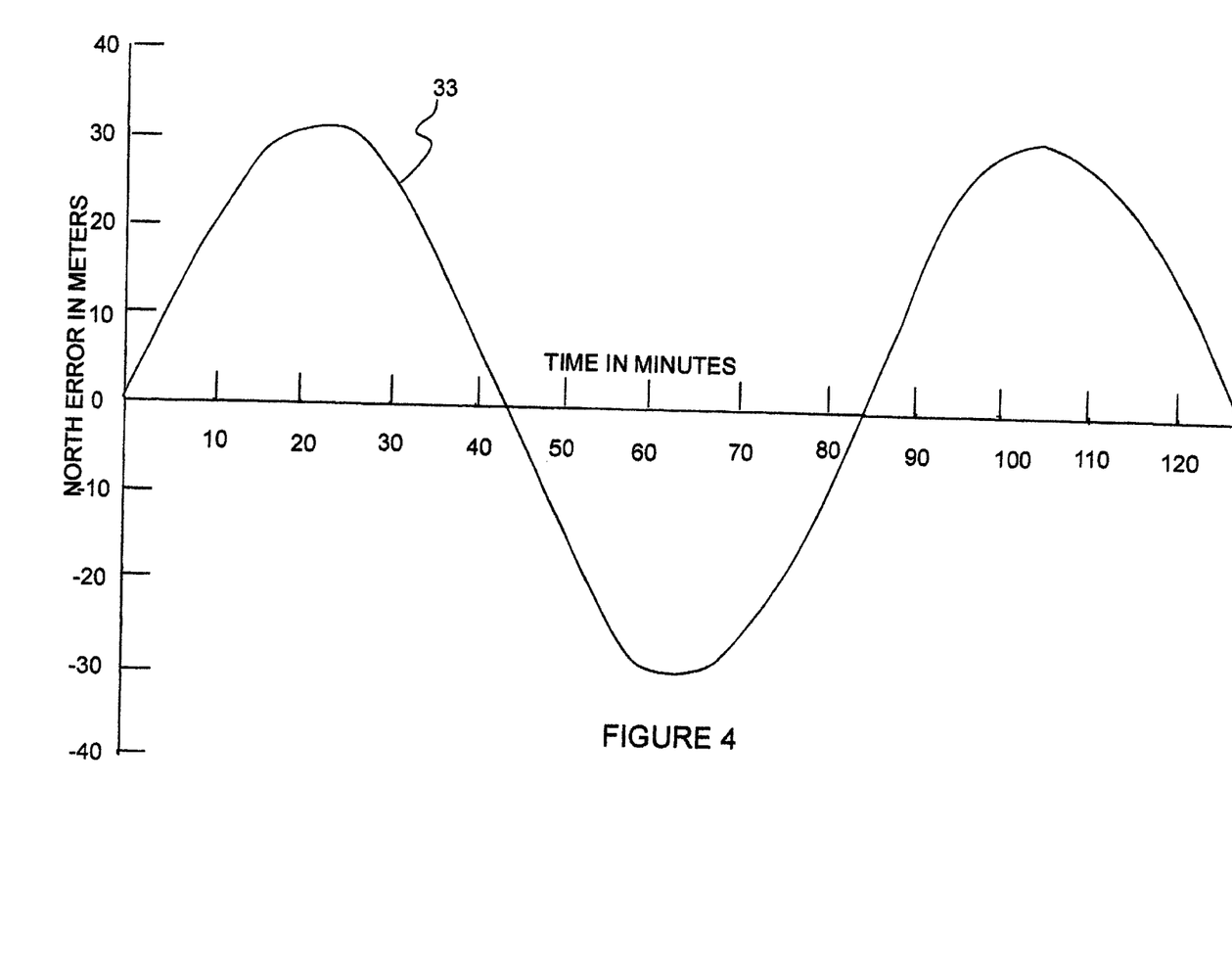
FIG. 4 is a graph of a simulated INS error.
Figure 5:
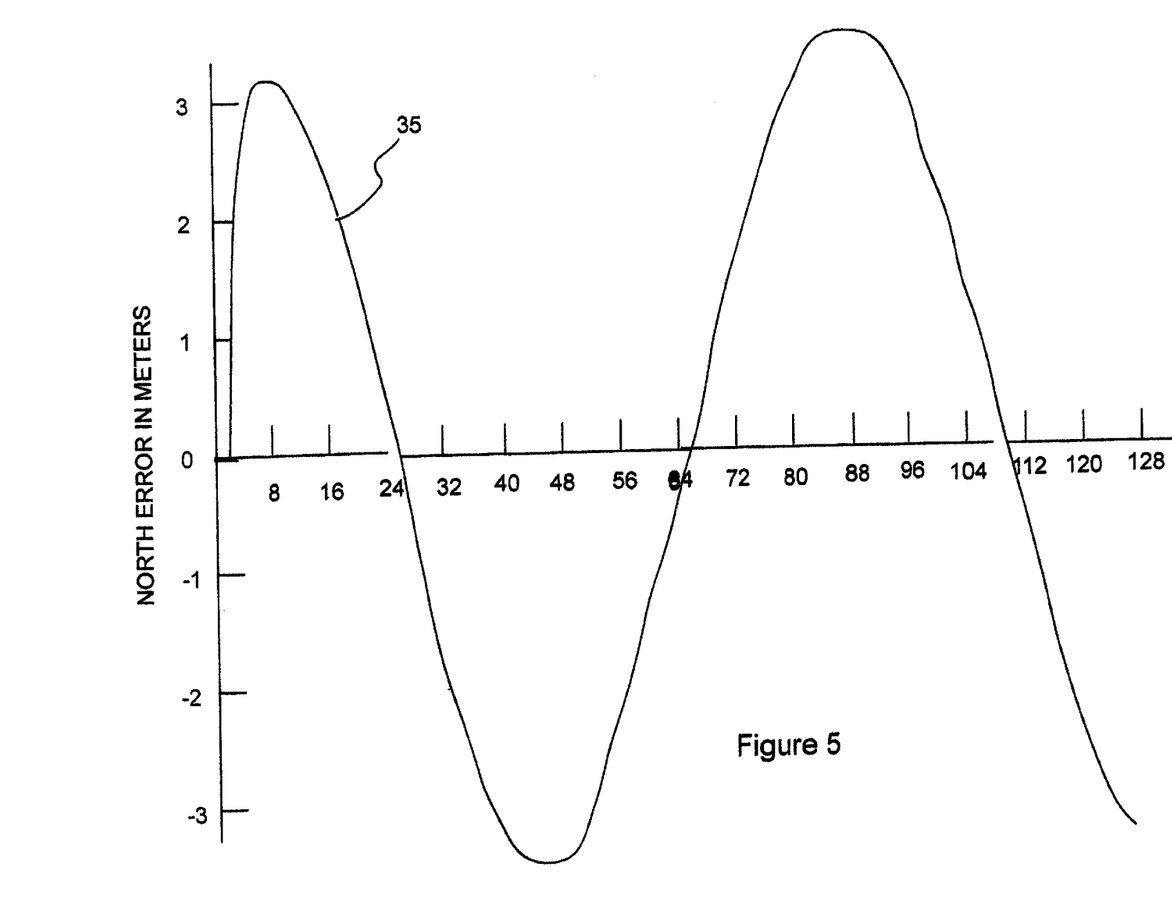
FIG. 5 is a graph of a GPS corrected INS position response to the simulated INS error shown in FIG. 4 with the implementation of the invention.

INS position correction improvement with the filtered difference between INS and GPS positions is illustrated in FIGS. 4–7. FIG. 4 illustrates an error function applied to the INS system which is a sine wave 33 with a peak error of 30 meters and a period of 84 minutes (Schuler oscillation), that is typical for an INS. The INS position response, of the system with a filter having a 2.5 minute time constant, a computation sample time of 42.5 milliseconds. and a zero GPS error, is shown in FIG. 5. As shown in the figure. the response is a sine wave 35 having a peak value that has been attenuated from 30 meters peak of the Schuler oscillation to 3.2 meters.

Figure 6:
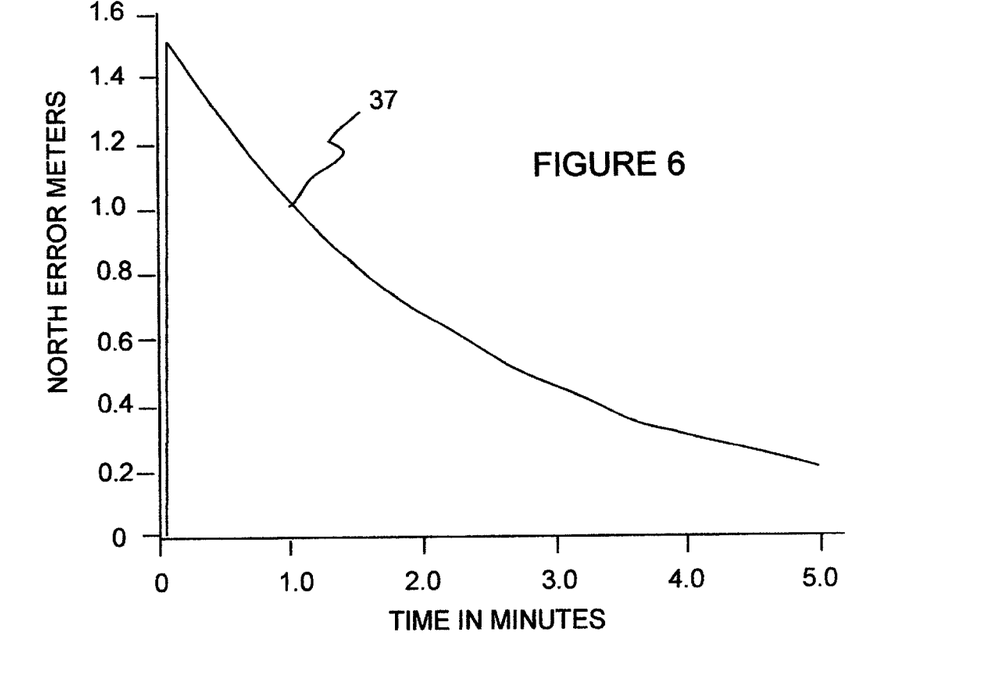
FIG. 6 is a graph of a simulated response of an INS corrected output for INS zero error and a one time GPS error.

FIG. 6 shows the response 37 of the INS corrected output for a zero INS error and a one time GPS error of 90 meters. The 90 meters GPS error is immediately attenuated to 1.5 meters and decays from there towards zero.

Figure 7:
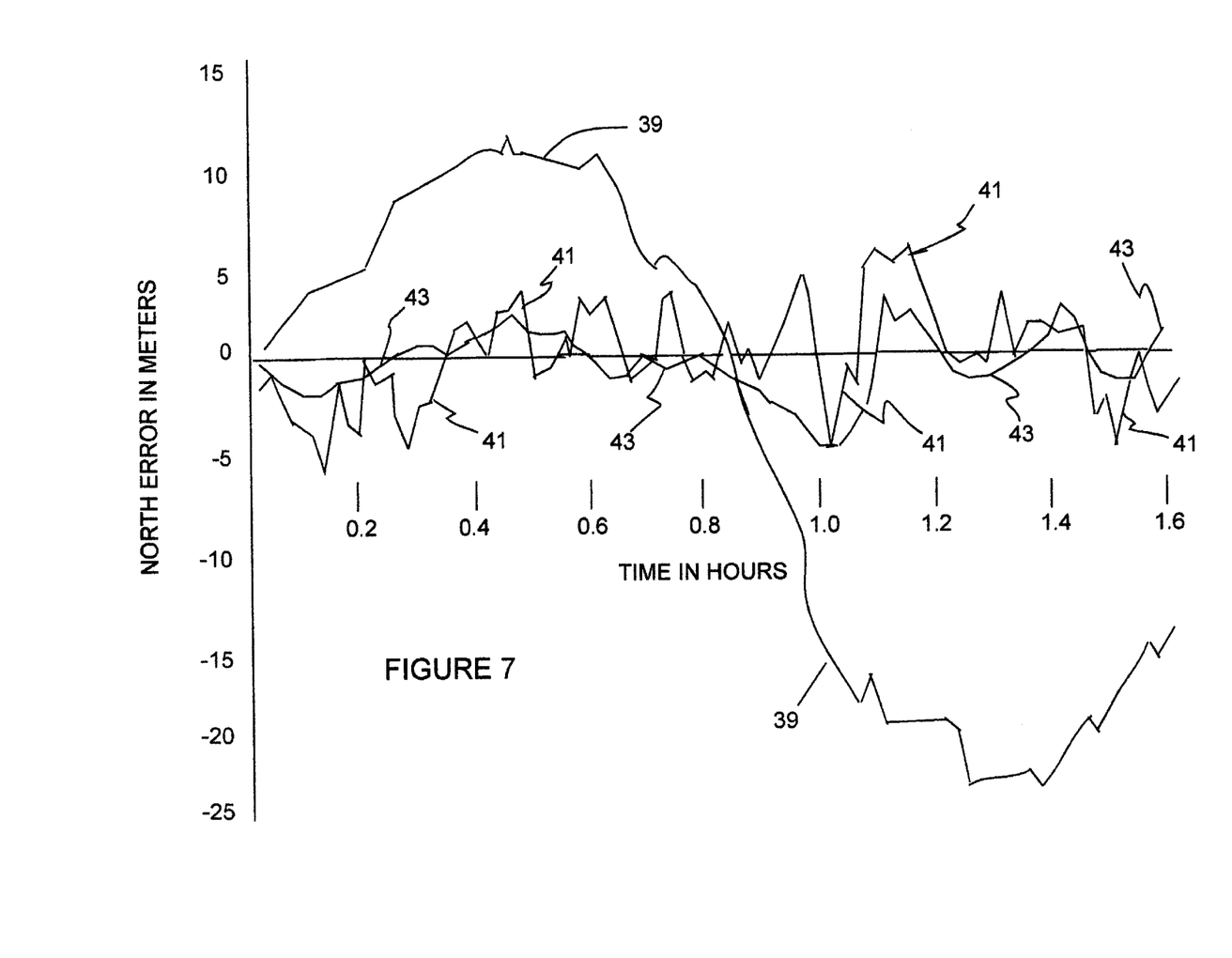
FIG. 7 is a plots of INS uncorrected error, a GPS error, and the corrected INS error filtered in accordance with the invention.

FIG. 7 illustrates the correction of an INS North Error 39, with the utilization of the GPS having a North error 41. As shown in the figure, the corrected INS (filtered) North error 43 has a corrected magnitude that is less than the magnitude of the GPS error.

While the invention has been described in its preferred embodiments, it is to understood that the words that have been used are words of description rather than limitation and that changes may be made with in the purview of the appended claims without departing from the true scope and spirit of the invention in its broader aspects.

We claim:

1. In an inertial navigation system (INS), at an INS location, of the type having inertial sensors coupled to a navigator, the navigator having an output at which position data is provided, said navigator output coupled to a differencing element to which an output, providing position data, of a global positioning system (GPS) receiver, at a GPS location, is also coupled, the differencing element providing GPS-INS position difference data that is coupled to a Kalman filter, the Kalman filter having an output from which correction position data is provided to the navigator, the improvement comprising:

a filter coupled to receive said GPS-INS position difference data and provide filtered position difference data; and means for adding said GPS-INS filtered position difference data to position data provided by said navigator to provide navigator corrected position data.

2. The inertial navigation system of claim 1 further including an editor coupled between said differencing element and said filter for eliminating position difference data exceeding a predetermined value.

3. The inertial navigation system of claim 2 further including:
a reset smoothing coupled to said Kalman filter output for providing correction data from said Kalman filter output in incremental steps; and
means coupled between said navigator and said adding means and to receive said incremental steps for applying each incremental step to said navigator position data until said correction data is completed.

4. The inertial navigation system of claim 3 further including a lever arm corrector coupled between said GPS receiver and said INS to correct GPS position data to said INS location.

5. The inertial navigation system of claim 4 further including another lever arm corrector coupled between said INS and an other INS, at an other location, for correcting said INS position data to said other INS location.

6. The inertial navigation system of claim 4 wherein said filter processes said GPS-INS position difference data in accordance with $$(\Delta F)_n = (\Delta F)_{n-1} + K[(\Delta I)_n - (\Delta F)_{n-1}]$$

where $(\Delta F)_n$ is an output of said filter after an $n^{th}$ iteration, $(\Delta F)_{n+1}$ is an output of said filter at an n−1 iteration, $(\Delta I)_n$ is position difference data inputted to said filter for said $n^{th}$ iteration, and K is a constant that is a ratio of an iteration period to said filter time constant.

7. The inertial navigation system of claim 4 wherein said filter comprises:
a subtraction element coupled to receive said GPS-INS position difference data at a $n^{th}$ predetermined time interval and said filtered position difference data at a (n−1) predetermined time interval to provide difference data;
a multiplier coupled to receive said difference data to provide multiplied difference data;
a summing element coupled to receive said multiplied difference data and said filtered position difference data at said (n−1) predetermined time interval to provide a sum of said multiplied difference data and said filtered position difference data, said sum being said filtered difference position data for said $n^{th}$ predetermined time interval.

8. The inertial navigation system of claim 1 wherein said filter processes said GPS-INS position difference data in accordance with $$(\Delta F)_n = (\Delta F)_{n-1} K[(\Delta I)_n - (\Delta F)_{n-1}]$$

where $(\Delta F)_n$ is an output of said filter after an $n^{th}$ iteration, $(\Delta F)_{n-1}$ is an output of said filter at an n−1 iteration, $(\Delta I)_n$ is position difference data inputted to said filter for said $n^{th}$ iteration, and K is a constant that is a ratio of an iteration period to said filter time constant.

9. The inertial navigation system of claim 1 wherein said filter comprises:
a subtraction element coupled to receive said GPS-INS position difference data at a $n^{th}$ predetermined time interval and said filtered position difference data at a (n−1) predetermined time interval to provide difference data;
a multiplier coupled to receive said difference data to provide multiplied difference data;
a summing element coupled to receive said multiplied difference data and said filtered position difference data at said (n−1) predetermined time interval to provide a sum of said multiplied difference data and said filtered position difference data at said (n−1) predetermined time interval, said sum being said filtered difference position data at said $n^{th}$ predetermined time interval.

10. The inertial navigation system of claim 1 further including a lever arm corrector coupled between said GPS receiver and said INS to correct GPS position data to said INS location.

11. A method for correcting position data of an inertial navigation system (INS), at an INS location, of the type having inertial sensors coupled to a navigator, the navigator having an output coupled to provide position data and coupled to a differencing element to which position data of a global positioning system (GPS) receiver, at a GPS location, is also coupled, the differencing element providing GPS-INS position difference data that is coupled to a Kalman filter, the Kalman filter having an output from which correction position data is provided to the navigator comprising the steps of:
filtering said GPS-INS position difference data to provide filtered position difference data; and
adding said filtered position difference data to said navigator position data.

12. The method of claim 11 further including the step of eliminating position difference data that exceed a predetermined level.

13. The method of claim 12 further including the steps of:
receiving correction data from said Kalman filter;
dividing said correction data into incremental steps; and
applying each incremental step to said navigation position data until said correction data is completed.

14. The method of claim 13 further including the step of correcting GPS position data to said INS location.

15. The method of claim 14 further including the step of correcting INS position data to an other INS at an other location.

16. The method of claim 13 wherein said filtering is in accordance with $$(\Delta F)_n = (\Delta F)_{n-1} + K[(\Delta I)_n - (\Delta F)_{n-1}]$$

where $(\Delta F)_n$ is an output of said filter after an $n^{th}$ iteration, $(\Delta F)_{n-1}$ is an output of said filter at an n−1 iteration, $(\Delta I)_n$ is position difference data inputted to said filter for said $n^{th}$ iteration, and K is a constant that is a ratio of an iteration period to said filter time constant.

17. The method of claim 11 wherein said filtering step includes the steps of:
subtracting said filtered position difference data at a (n−1) predetermined time interval from said GPS-INS difference data at a $n^{th}$ predetermined time interval to provide difference data; multiplying said filter difference data by a predetermined constant to obtain multiplied difference data;
adding said multiplied difference data to said filtered position difference data at said (n−1) predetermined time interval to obtain filtered position difference data at said $n^{th}$ predetermined time interval.

18. The method of claim 11 wherein said filtering step is in accordance with $$(\Delta F)_n = (\Delta F)_{n-1} + K[(\Delta I)_n - (\Delta F)_{n-1}]$$

where $(\Delta F)_n$ is an output of said filter after an $n^{th}$ iteration, $(\Delta F)_{n-1}$ is an output of said filter at an n−1 iteration, $(\Delta I)_n$ is position difference data inputted to said filter for said $n^{th}$ iteration, and K is a constant that is a ratio of an iteration period to a time constant of said filter.

19. The method of claim 11 wherein said filtering step includes the steps of:

subtracting said filtered position difference data at a (n−1) predetermined time interval from said GPS-INS difference data at a $n^{th}$ predetermined time interval to provide difference data;

multiplying said filter difference data by a predetermined constant to obtain multiplied difference data;

adding said multiplied difference data to said filtered position difference data at said (n−1) predetermined time interval to obtain filtered position difference data at said $n^{th}$ predetermined time interval.

20. The method of claim 11 further including the step of correcting GPS position data to said INS location.

* * * * *